(12) United States Patent
Laor

(10) Patent No.: US 7,616,754 B2
(45) Date of Patent: Nov. 10, 2009

(54) METHOD AND SYSTEM FOR COMPUTER-BASED PRIVATE BRANCH EXCHANGE

(75) Inventor: Herzel Laor, 2050 Hillsdale Cir., Boulder, CO (US) 80305

(73) Assignee: Herzel Laor, Boulder, CO (US)

( * ) Notice: Subject to any disclaimer, the term of this patent is extended or adjusted under 35 U.S.C. 154(b) by 1185 days.

(21) Appl. No.: 10/283,183

(22) Filed: Oct. 30, 2002

(65) Prior Publication Data

US 2003/0091177 A1    May 15, 2003

Related U.S. Application Data

(60) Provisional application No. 60/344,508, filed on Nov. 9, 2001.

(51) Int. Cl.
*H04M 7/00* (2006.01)
(52) U.S. Cl. ......................... 379/229; 379/230
(58) Field of Classification Search ............... 379/229, 379/230, 201.01, 219, 220.01, 198, 265.01–265.14
See application file for complete search history.

(56) References Cited

U.S. PATENT DOCUMENTS

| | | | |
|---|---|---|---|
| 4,313,036 A | 1/1982 | Jabara et al. | 179/18 AD |
| 5,341,374 A | 8/1994 | Lewen et al. | 370/450 |
| 5,452,289 A | 9/1995 | Sharma et al. | 370/286 |
| 5,471,470 A | 11/1995 | Sharma et al. | 370/271 |
| 5,604,737 A | 2/1997 | Iwami et al. | 370/352 |
| 5,742,596 A | 4/1998 | Baratz et al. | 370/356 |
| 5,892,764 A | 4/1999 | Riemann et al. | 370/401 |
| 6,359,892 B1 | 3/2002 | Szlam | 370/401 |
| 6,407,996 B1 | 6/2002 | Witchalls | 370/352 |
| 6,470,008 B1 | 10/2002 | Khuc | 370/352 |

OTHER PUBLICATIONS

International Search Report for Application No. PCT/US02/35070, dated Feb. 4, 2003 (mailing date).

*Primary Examiner*—William J Deane
(74) *Attorney, Agent, or Firm*—Kilpatrick Stockton, LLP

(57) ABSTRACT

A computer-based distributed private branch exchange (PBX). Preferred embodiments route calls and perform other functions of a PBX as well as performing services not commonly available on a PBX, such as Internet telephony. In one embodiment, the invention control and operations is distributed among several computers or Personal Computers (PCs) on a computer network.

6 Claims, 4 Drawing Sheets

METHOD AND SYSTEM FOR COMPUTER-BASED PRIVATE BRANCH EXCHANGE

CROSS REFERENCE TO RELATED APPLICATIONS

This application claims priority to U.S. Provisional Patent Application 60/344,508 filed Nov. 9, 2001.

BACKGROUND

1. Field of the Invention

This invention relates to a design of a private branch exchange (PBX) using a computer network to route calls.

2. Description of Related Art

Private branch exchanges are expensive hardware equipment that most companies with more then very few employees typically buy and use. The cost can be several tens of thousands of dollars for a PBX with few lines. See a common design of an office computer and PBX system in FIG. 1. In some instances, systems including dedicated PBX server hardware have been used.

There are computer programs that enable long distance phone calls to be made over the Internet, at a very low or no cost apart from the cost of being connected to the Internet. Internet telephony standards are emerging. Equipment that connects a single phone line or multiple lines to a computer or a computer network is available and relatively inexpensive. The figures show Ethernet 10 interconnecting the Personal Computers (PCs), as Ethernet is very common network technology; but other types of networking are available. The Internet can be connected via a server 20 and firewall or can be directly connected to the network 10 interconnecting the PCs.

A typical PBX 30, along with associated hardware, performs at least the following functions: accept incoming calls and direct these calls to the intended recipient on an internal line; enable an internal line to connect to an outgoing line and make a call; enable an internal line to connect to another internal line and make a call; transfer outgoing calls or incoming calls from one internal line to another; add a line to existing call (conference calls); response with voice mail system when a line is busy or do not answers; allow calls to be held temporary without being connected, and later to be connected to a line upon request or when a line becomes available; service held calls with audio broadcast or announcements; record calls, and speed dial functions.

SUMMARY OF THE INVENTION

A computer-based distributed private branch exchange (PBX). Preferred embodiments route calls and perform other functions of a PBX as well as performing services not commonly available on a PBX, such as Internet telephony. In one embodiment, the invention control and operations is distributed among several computers or Personal Computers (PCs) on a computer network.

DESCRIPTION OF THE SEVERAL VIEWS OF THE DRAWING(S)

DETAILED DESCRIPTION OF THE INVENTION

Figure 1:
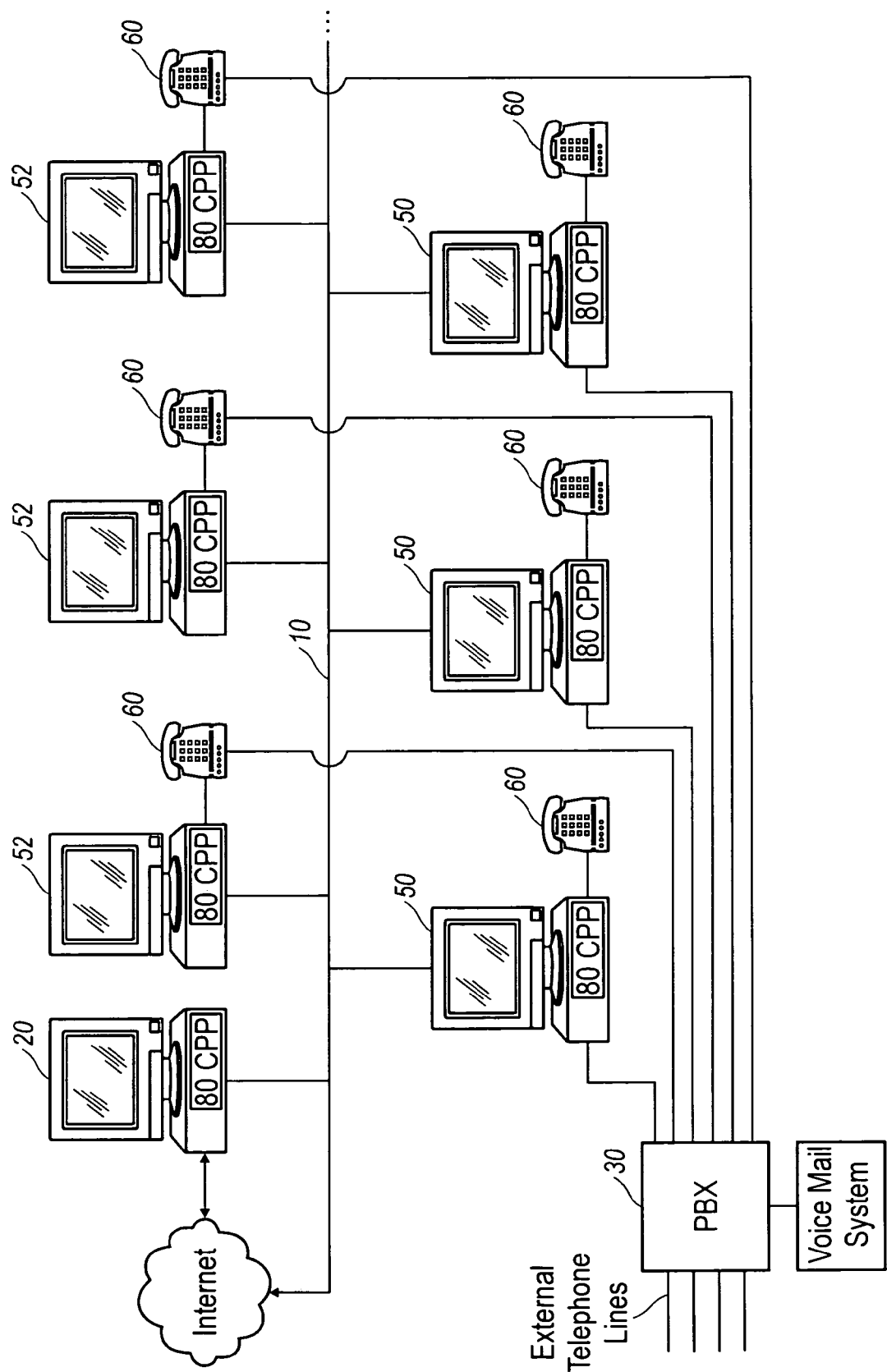
FIG. 1 illustrates the relationship between conventional PBX and a computer network.
Figure 2:
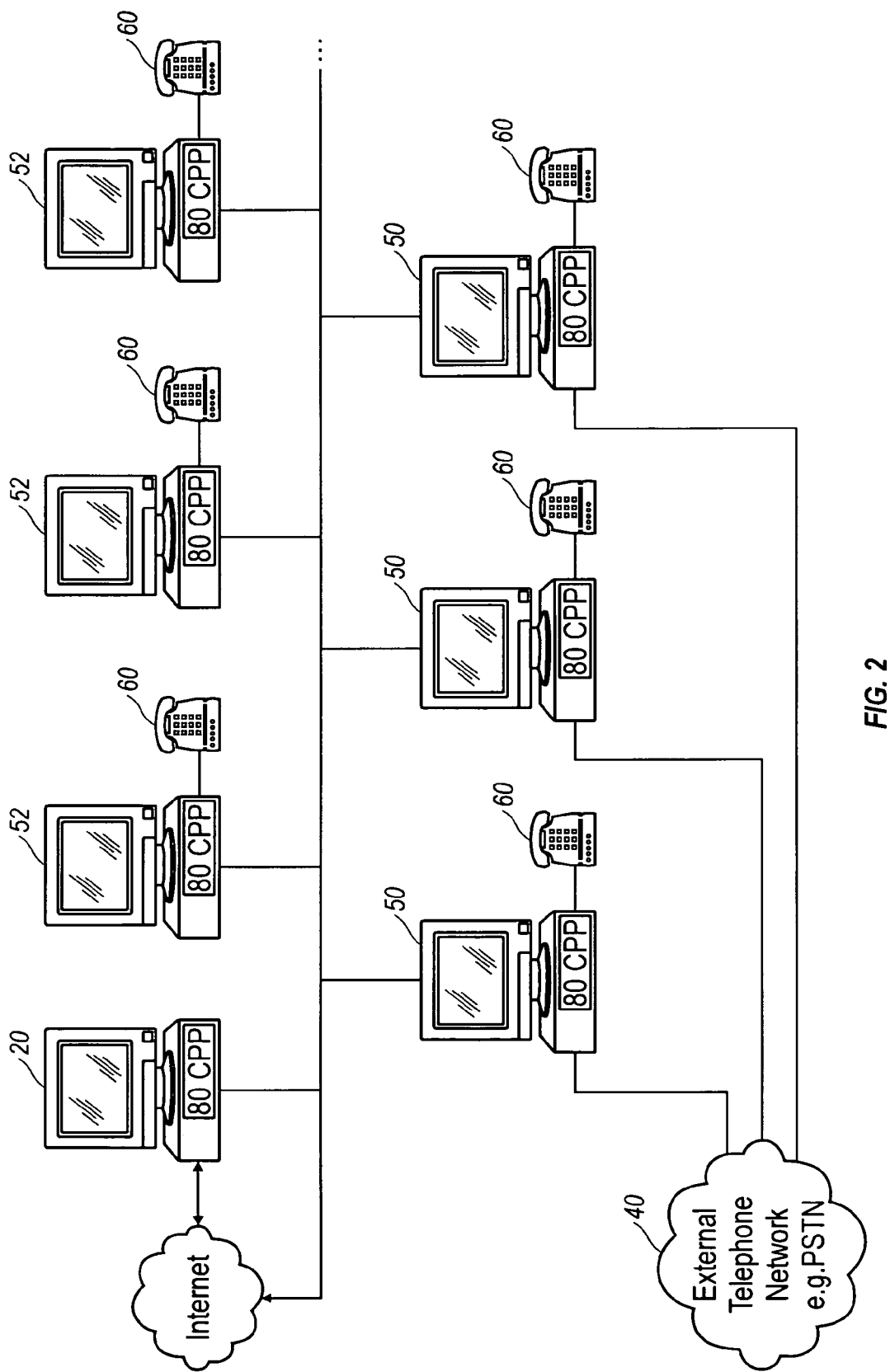
FIG. 2 illustrates an embodiment of the present invention where external phone lines are connected directly to one or more networked computers.

Preferred embodiments of the present invention perform each of the above-described functions, and more, by a virtual system on a computer network, a "Computer Based PBX" or "Distributed PBX." Referring to FIG. 2, there are three external phone lines 40 connected to three PCs 50 via internal or external modems. There are total of six PCs 50, 52 and one network applications/internet server 20 (as opposed to dedicated PBX server) shown. This configuration can service a small office with six employees. In general, N incoming phone lines can service M people with X number of PCs; where M does not have to equal N.

Figure 4:
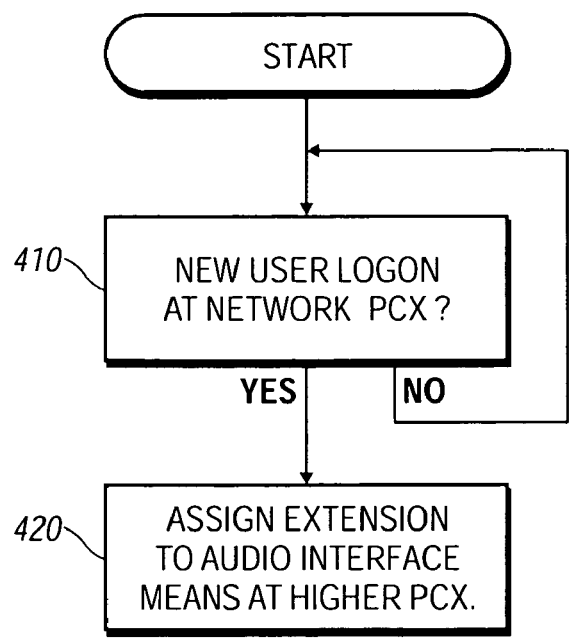
FIG. 4 is a flowchart that illustrating the PBX CCP's role in dynamic assignment of extension at user login to a network computer corresponding to the audio interface means in one embodiment of the present invention.

As stated above, embodiments of the present invention are implemented as a virtual system on a computer network. As such, systems of the invention include at least one PBX computer program product 80 embodying a substantial portion of the functionality of the system. Beyond the typical functions of a PBX, as noted in the background, the computer program product 80 is involved in functions such as dynamic assignment of an extension number to audio interface means, e.g., 60 of the system. As illustrated in FIG. 4, this assignment 420 can be initialized on user login 410 to a network computer corresponding to the particular audio interface means.

In a preferred embodiment, when an incoming call is arriving on one of the external phone lines 40, a system of the present invention detects the ring and answers with a request to the caller to dial the number of the internal line. The caller can also be prompt to say the extension number or the name of the person he is calling. More then six persons can use the PCs 50, 52 in FIG. 2 at different times, and each user can set a different active extension number to each computer when he uses it. The PC receiving the call will route this call to the correct person. The PC this person is using will ring and display a window that allow the person to accept the call, transfer it to a different person or transfer it to the answering service. When answering, the person can elect to use an audio interface means, e.g., the standard microphone and speakers attached to the PC (not shown), a special-made handset or headset 60 that is attached to a port on the PC, or a traditional telephone instrument adapted for interface to the PC. Unanswered incoming calls or calls that are intended to a person that do not have active PC at the time the call arrives can be directed to the answering service.

Outgoing calls can be originated from any PC, using any available external phone line. Internal calls within the group of PCs can originate from any PC.

After the call is connected, the person answering or making it can add another person to the call by requesting a connection on the window servicing the phone system. He can transfer the call to another person, to the voice mail system, put the call on hold, or terminate the call. A call can be recorded by a request or automatically. Saved messages can be played to the call.

In some embodiments of the present invention, control of the invention is distributed among the computers—e.g., PCs 50, 52, the network applications/internet server 20, etc. The user interface is also on the PC's screen. From a window on his PC, a person can control his use of the invention.

Figure 3:
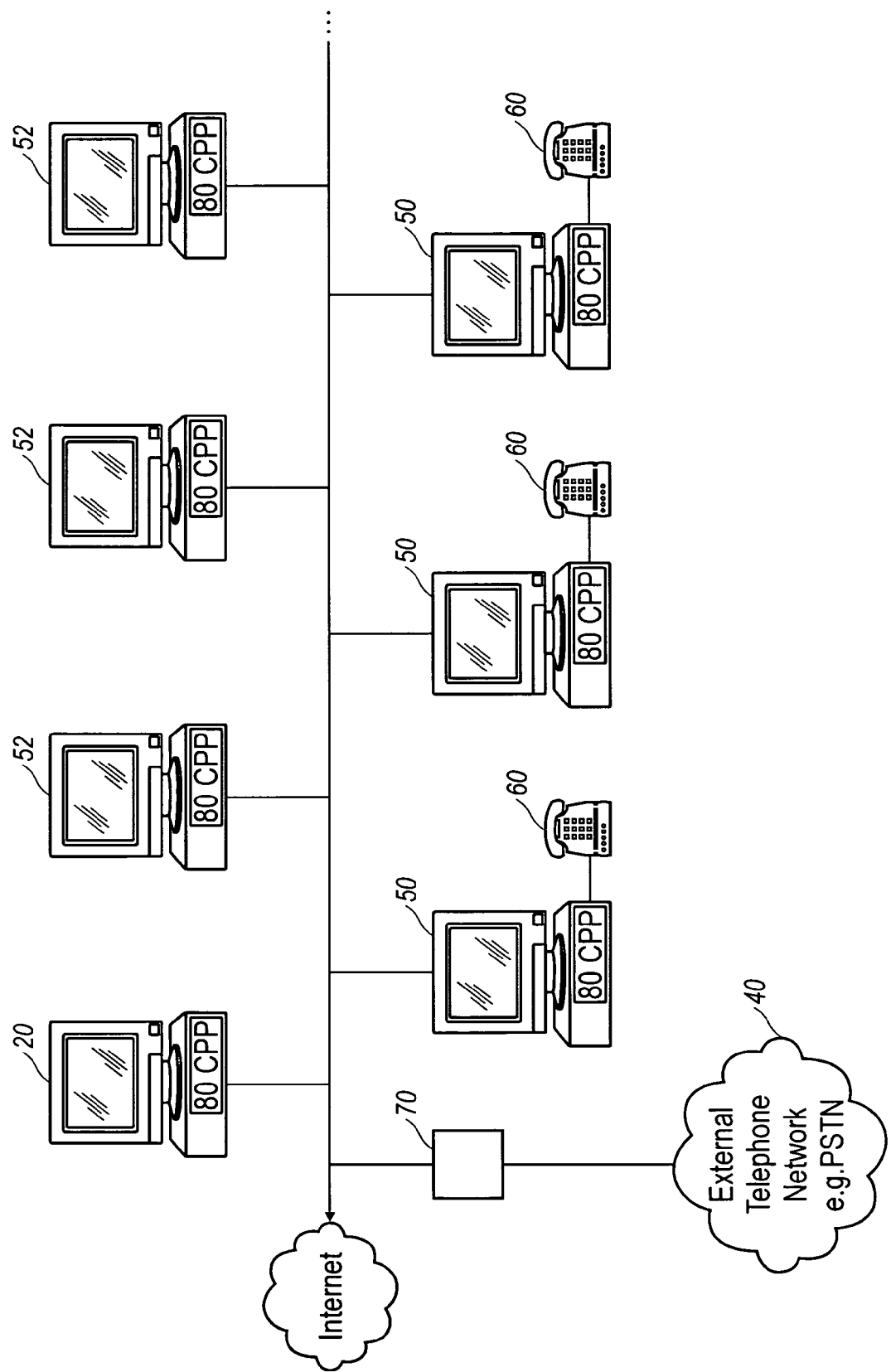
FIG. 3 illustrates an embodiment of the present invention where one or more phone lines are connected to a network.

In other embodiments of the invention, the external phone lines can be connected directly to the network, using a special network modems 70. This configuration is shown in FIG. 3. However, in preferred embodiments, routing of calls is done from the PCs 50 as in the description of FIG. 2.

In some embodiments, the PCs need not be all in one location. Several locations are possible with private network interconnecting these locations or with the public Internet interconnection. A person working from home can have one or two PCs connected to the Internet and embodiments of the present invention will service him as if he was in the office. During travel, each time a laptop PC is connected to the Internet it can become part of the distributed system.

Preferred embodiments of the present invention allow the answering service function to be performed from each PC for the person or persons using this PC. The feature of answering service is flexible in structure, and in some embodiments, the user can select the use of a PC or server. If a PC is a portable PC, e.g. a laptop, the PC can perform the answering service while connected to the network, and any other PC, or the server, can perform this service otherwise. Upon connecting to the network, the portable PC can collect from the server all saved messages and updated settings. Any PC on the network, or the server, can act as an automatic back up for saving messages to any other PC on the network.

The window (or a part of a window) on each PC that operates the answering service can enable the change of setting of the answering service, save outgoing messages, and playback messages. Stored messages can be displayed with the caller ID if available, with the caller name if he was prompt to say his name, or with a transcription of the message.

Figure 5:
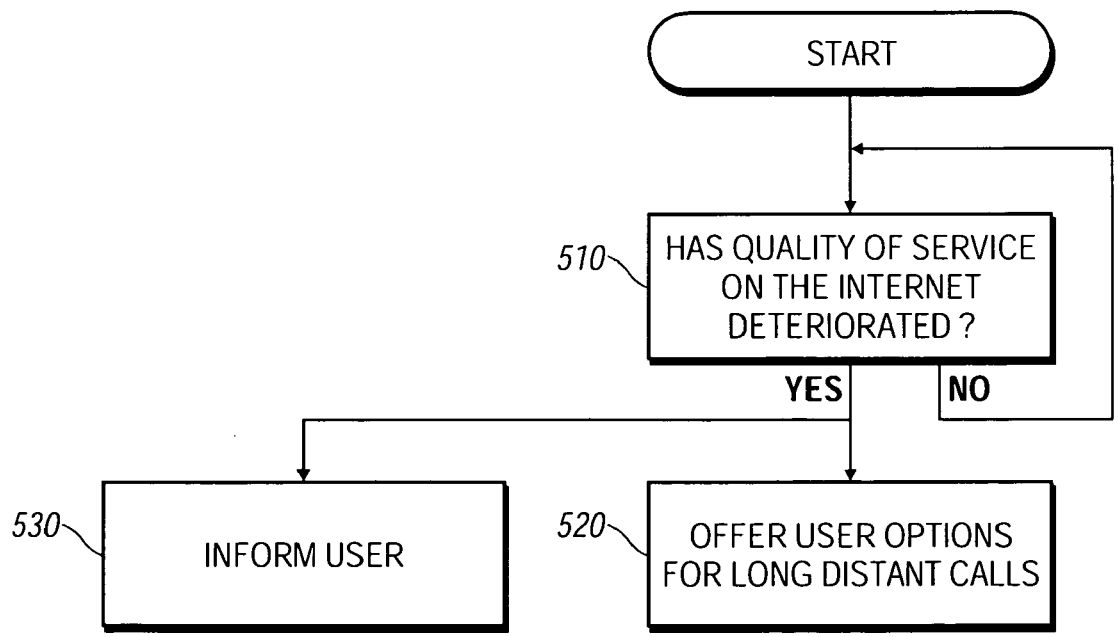
FIG. 5 is a flowchart illustrating a method for enabling a user to select between use of the Internet and a public switched telephone network based at least in part on the quality of service of the Internet connection in one embodiment of the present invention.

There are services of Internet telephony available today, where a person can initiate a call on the Internet and access the public telephone system from a line that is near his call destination, avoiding paying tolls. The present invention can use such services to generate outgoing calls and to accept incoming calls, over the Internet. A large company can have many local offices and outgoing calls can be routed to access the public telephone system at a beneficial location. Alternatively, and as illustrated in FIG. 5, if the quality of service on the Internet deteriorates 510, a caller can select to enter the public telephone system at his local area and pay the cost of making the call this way. In preferred embodiments, the present invention offers to the user options for long distance calls 520 so he can choose what service he wants. The invention can check the current quality of service on the Internet and inform the user 530.

Telephone lines that enter the site can be terminated at the standard telephone sets and be used directly if the network or some of the PCs are down. This telephone connection will be in parallel to the connection to the PC as in FIG. 2 or the connection to network modems as in FIG. 3.

It is well known that basic service on the Public Switched Telephone Network (PSTN) is typically limited to voice grade channel (VGC) bandwidth. Due to the high network capacity, all calls that are not connecting to the public telephone system can have high audio quality (Hi-Fi). Embodiments of the invention are operative to route those calls not destined for interaction with the telephone network at greater than voice grade channel bandwidth. Video-telephone services can be enabled. Such services can have the full spectrum of connectivity of the phone connectivity and services on the PBX. Video-mail can be added to voice-mail, etc. There are some small differences for a video-telephone service, like the need of a camera connected to the PC and the need to split the display window in a conference call.

If a distributed computer-based PBX is used in a call center, there can be more external phone lines then PCs. In such a case, the distributed PBX will manage the line of callers, service music, and announcements to the people waiting to be answered, and other common services of a call server.

The invention claimed is:

1. A communications system comprising:
   a computer network comprising a plurality of computers;
   a plurality of audio interface means, and
   at least one private branch exchange computer program product operative to:
   execute private branch exchange functions on a network computer; and
   dynamically assign extension numbers to at least one audio interface means at least in part as a function of a user login at a network computer corresponding to the assigned audio interface means.

2. A communications system according to claim 1 where the person using a computer can dynamically cause the system to assign extension number to the computer he is using.

3. A communications system according to claim 1 where the person using a computer can dynamically cause the system to assign extension name to the computer he is using.

4. A communications system according to claim 1 where the computer network is a private network.

5. A communications system according to claim 1 where the computer network is the Internet.

6. A communications system according to claim 1 where the computer network is a combination of a private network and the Internet.

* * * * *

UNITED STATES PATENT AND TRADEMARK OFFICE
CERTIFICATE OF CORRECTION

PATENT NO.      : 7,616,754 B2                                    Page 1 of 1
APPLICATION NO. : 10/283183
DATED           : November 10, 2009
INVENTOR(S)     : Herzel Laor It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1678 days.

Signed and Sealed this

Fourteenth Day of December, 2010

David J. Kappos
*Director of the United States Patent and Trademark Office*